No. 656,664.  
E. B. ROTH.  
GRINDING MACHINE.  
(Application filed Jan. 2, 1900.)  
Patented Aug. 28, 1900.
(No Model.)
2 Sheets—Sheet 1.
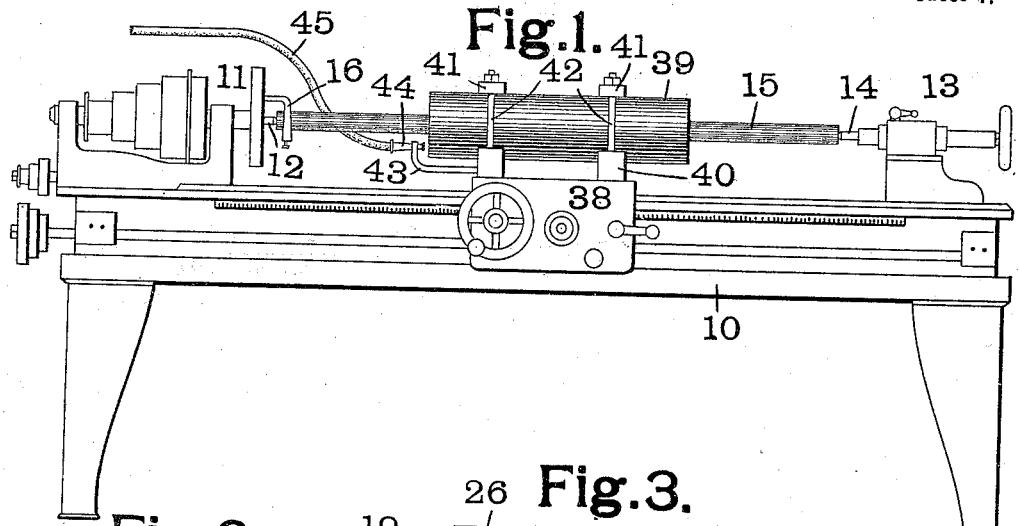
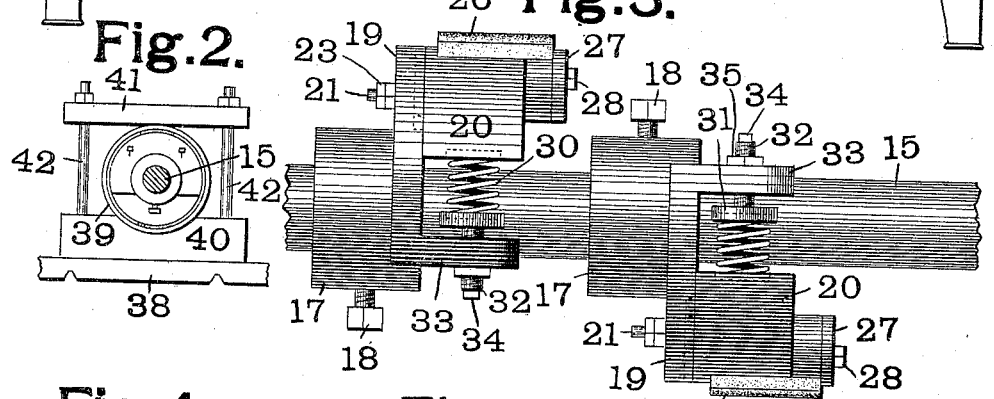
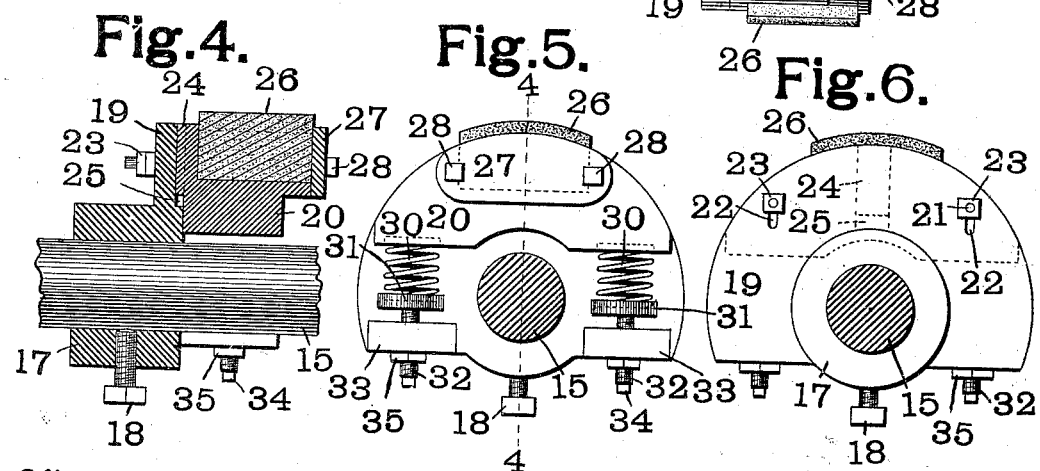
Witnesses  
W. H. Alexander  
David Stannard
Inventor  
Edward B. Roth  
By Attorneys  
Fowler & Fowler
THE NORRIS PETERS CO., PHOTO-LITHO., WASHINGTON, D. C.

No. 656,664. Patented Aug. 28, 1900.
E. B. ROTH.
GRINDING MACHINE.
(Application filed Jan. 2, 1900.)
(No Model.) 2 Sheets—Sheet 2.
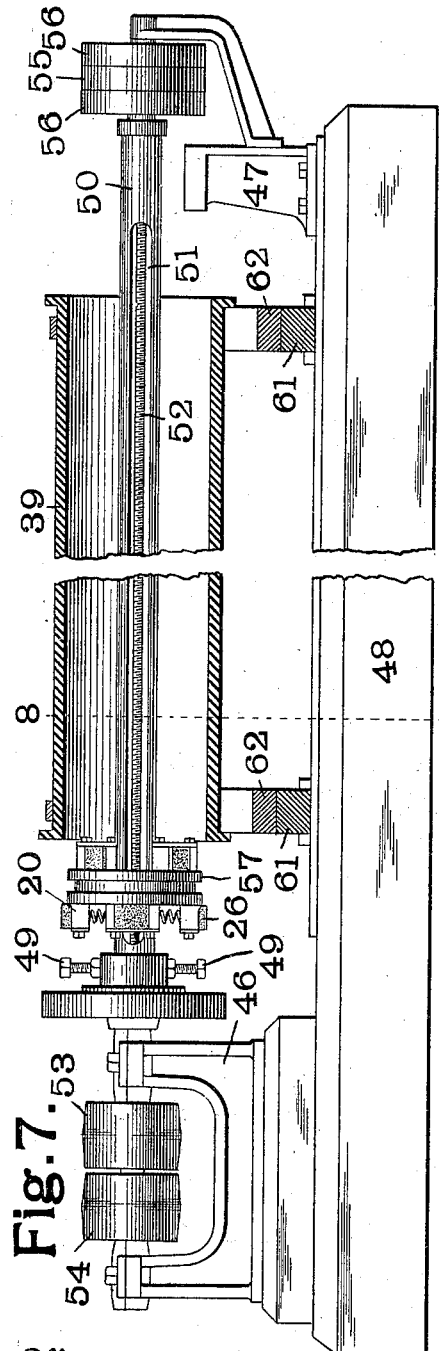
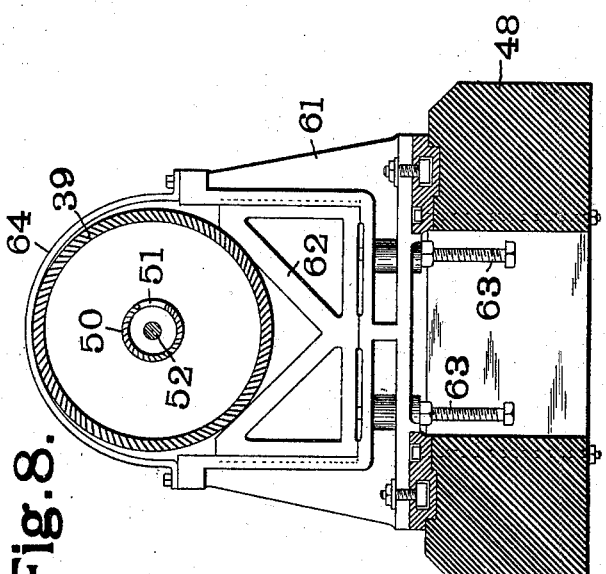
Witnesses
W. A. Alexander
David Stannard
Inventor
Edward B. Roth
By Attorneys
Fowler & Fowler
THE NORRIS PETERS CO., PHOTO-LITHO., WASHINGTON, D. C.

UNITED STATES PATENT OFFICE.

EDWARD B. ROTH, OF ST. LOUIS, MISSOURI.

GRINDING-MACHINE.

SPECIFICATION forming part of Letters Patent No. 656,664, dated August 28, 1900.

Application filed January 2, 1900. Serial No. 51. (No model.)

*To all whom it may concern:*

Be it known that I, EDWARD B. ROTH, a citizen of the United States, residing at the city of St. Louis, in the State of Missouri, have invented a certain new and useful Grinding-Machine, of which the following is such a full, clear, and exact description as will enable any one skilled in the art to which it appertains to make and use the same, reference being had to the accompanying drawings, forming part of this specification.

My invention relates to a machine for grinding out the interiors of cylinders or tubes. My machine is especially adapted for grinding out cylinders made from ordinary iron pipe, in which the interior surface is somewhat irregular, owing to bends in the pipe and other causes. My machine, however, is also suitable for removing tool-marks from cylinders which have been previously bored out true.

My invention consists, primarily, in the combination, with a grinding device, of a cylinder-holding device, one of said devices being yieldingly mounted, means for rotating one of said devices, and means for feeding one of said devices longitudinally.

My invention also consists in various other novel features and details of construction, all of which are described in the following specification and pointed out in the claims affixed hereto.

In the accompanying drawings, which illustrate one form of grinding-machine made in accordance with my invention, Figure 1 is a side elevation on a reduced scale. Fig. 2 is a view, also on a reduced scale, showing the manner of securing the cylinder in the machine. Fig. 3 is a side elevation of two of the grinding-tools. Fig. 4 is a section on the line 4 4 of Fig. 5. Fig. 5 is an end view of one of the grinding-tools. Fig. 6 is a view similar to Fig. 5, but looking at the opposite end. Fig. 7 is a view, partly in elevation and partly in section, showing a modified form of my machine. Fig. 8 is a slightly-enlarged section on the line 8 8, Fig. 7; and Fig. 9 is an enlarged view of a modified form of the grinding-tool.

Like marks of reference refer to similar parts in the several views of the drawings.

10 represents the bed of an ordinary machine-lathe.

11 is the head-stock, provided with a live-center 12, and 13 the tail-stock, provided with a dead-center 14.

15 is a shaft which is held between the live-center 12 and the dead-center 14 in the usual manner. The power is preferably communicated from the head-stock 11 to the shaft 15 by means of a dog 16 in the usual manner. Carried by the shaft 15 are one or more grinding-tools, which are described below.

17 is a collar which is secured to the shaft 15 by means of set-screw 18. Carried by the collar 17 is a flange 19.

20 is a sliding block which is secured to the flange 19 by means of bolts 21 passing through slots 22 in the said flange and provided with nuts 23. The block 20 is provided with a guide-rib 24, which runs in a guideway 25, formed in the flange 19. A pocket is formed in the block 20, in which a grinding-stone 26, of suitable material, such as emery, is secured by means of a plate 27 and bolts 28. The block 20 is forced out radially by means of springs 30, one end of each of which rests against the said block 20 and the other against the disk 31, carried by a screw-threaded rod 32, passing through a bracket 33. The bracket 33 is carried by the flange 19. Each of the bolts 32 is provided with a square head 34, by means of which it may be adjusted, and a lock-nut 35 for locking it in position.

38 is the carriage of the lathe. The cylinder 39, which is to be ground, rests upon lower cross-pieces 40, secured to the carriage 38, and is held in place by upper cross-pieces 41 and bolts 42. Secured to one of the lower cross-pieces 40 is a bracket 43, which carries a nozzle 44, connected with a flexible tube 45, through which a stream of air or water may be forced to carry out the material ground from the interior of the cylinder 39.

The operation of the above-described machine is as follows: After the cylinder 39 has been secured to the carriage 38 the shaft 15 is passed through it and secured in position between the centers of the lathe. The grinding-tools, preferably two or more in number, are secured to the shaft 15. The grinding-stones 26 of the several grinding-tools are preferably of different grades of coarseness, so that the coarse grinding and finishing may be done at one operation. The lathe is now started, so as to rotate the shaft 15 and at the same time to feed the carriage 38 and cylinder 39 longitudinally. This will cause the grinding-stones 36 to grind out the interior of the cylinder 39. The spring mounting of the stones causes them to follow up any irregularity of the interior of the cylinder and grind the same, preferably, smooth. The pressure of the stones 26 against the interior of the cylinder 39 can be regulated by turning the bolts 32 to compress the springs 30, more or less. When the stones 26 have become worn, they can be replaced with new ones by simply loosening the bolts 28. The stream of air or water forced through the nozzle 44 will aid the grinding by removing the loose particles and will also tend to prevent the cylinder from heating.

In the modification shown in Figs. 7, 8, and 9 a head-stock 46 and a tail-stock 47 are mounted on a base 48. Secured to the head-stock 46, by means of set-screws 49, is one end of a sleeve or hollow shaft 50, which is provided with a longitudinal slot 51. Within the sleeve or hollow shaft 50 is a threaded rod 52. The head-stock 46 is provided with a tight pulley 53 and a loose pulley 54. The tight pulley 53 drives the sleeve or hollow shaft 50. The tail-stock 47 is provided with a loose pulley 55 and two tight pulleys 56. The tight pulleys 56 are arranged to drive the threaded rod 52. The grinding-tool consists of a disk 57, having an inwardly-projecting portion 58, which projects through the slot 51 in the sleeve or hollow shaft 50. The inwardly-projecting portion is provided with a hub 59, which engages the threaded rod 52. The grinding-tool is provided with sliding members 20, carrying grinding-blocks 26, as in the grinding-tool previously described. In this case, however, the springs 30 bear upon triangular blocks 60, which are either secured to or formed integral with the disk 57. In case it is desired to grind out small cylinders, grinding-tools like that previously described may be used, except that they will be provided with inwardly-projecting portions 58 and hubs 59 for engaging with the sleeve 50 and threaded rod 52. The cylinder 39 is held by means of frames 61, carried by the base 48. Each of the frames 61 is provided with a V-shaped sliding member 62, which is adjusted by means of set-screws 63 and coöperate with straps 64. The operation of this portion of this device is like that above described, except that the cylinder to be ground is held stationary and the grinding-tool is fed longitudinally by means of the threaded rod 52. It will be understood that if the sleeve 50 and threaded rod 52 rotate in the same direction and at the same speed the grinding-tool would not move; but if the rod 52 is moved at a greater speed than the sleeve 50 by means of one of the tight pulleys 56 the grinding-tool will be fed longitudinally in one direction; but if the said rod 52 is rotated more slowly than the sleeve 50 by means of the other tight pulley 56, the grinding-tool will be fed in the opposite direction.

I am aware that grinding-machines have been heretofore constructed in which grinding-blocks carried by spring-arms were caused to bear against the outsides of rolls or cylindrical bodies. I am also aware that grinding-machines have been heretofore constructed in which two blocks of grinding material were held on expansible arms and caused to bear against the interior of a hollow vessel by manually operating a rod, and therefore I do not claim such constructions.

I am aware that many changes may be made in the form and construction of my machine without departing from the spirit of my invention, and therefore do not wish to limit myself to the form shown and described except where so specifically stated in the claims.

Having fully described my invention, what I claim as new, and desire to secure by Letters Patent of the United States, is—

1. In a grinding-machine, a cylinder-holding device, a grinding device bearing against the interior of the cylinder held by said cylinder-holding device, one of said devices being mounted to automatically yield, means for rotating one of said devices, and means for feeding one of said devices longitudinally.

2. In a grinding-machine, a cylinder-holding device, a grinding device mounted to bear against the interior cylinder held in said cylinder-holding device and to automatically yield, means for rotating one of said devices, and means for feeding one of said devices longitudinally.

3. In a grinding-machine, a cylinder-holding device, a grinding device mounted to bear against the interior of a cylinder held by said cylinder-holding device, and to yield automatically, means for rotating said grinding device, and means for feeding said grinding device longitudinally.

4. In a grinding-machine, a shaft, a member carried by said shaft, a grinding-stone yieldingly mounted in said member, means for holding a cylinder around said shaft, and means for rotating said shaft.

5. In a grinding-machine, a shaft, a member mounted on said shaft, a grinding-stone slidingly mounted in said member, springs for forcing said grinding-stone out radially, and means for varying the pressure of said spring.

6. In a grinding-machine, a shaft, a grinding-tool slidingly mounted on said shaft to rotate therewith, means for feeding said grinding-tool longitudinally, means for rotating said shaft, and a grinding-stone carried by said grinding-tool.

7. In a grinding-machine, a sleeve, means for rotating said sleeve, a grinding-tool slidingly mounted on said sleeve to rotate therewith, and a threaded rod within said sleeve and adapted to actuate said grinding-tool.

8. In a grinding-machine, a shaft, a grinding-tool slidingly mounted on said shaft to rotate therewith, means for feeding said grinding-tool longitudinally, means for rotating the said shaft, and a grinding-stone mounted in said grinding-tool to yield radially.

In testimony whereof I have hereunto set my hand and affixed my seal in the presence of the two subscribing witnesses.

EDWARD B. ROTH. [L. S.]

Witnesses:
W. A. ALEXANDER,
DAVID STANNARD.